United States Patent
Levi

[11] Patent Number: 6,092,972
[45] Date of Patent: *Jul. 25, 2000

[54] TRUCK MOUNTED LADDER RACK

[76] Inventor: Avraham Y. Levi, 757 Decorah La., St. Paul, Minn. 55120

[ * ] Notice: This patent issued on a continued prosecution application filed under 37 CFR 1.53(d), and is subject to the twenty year patent term provisions of 35 U.S.C. 154(a)(2).

[21] Appl. No.: 09/158,679

[22] Filed: Sep. 22, 1998

Related U.S. Application Data

[60] Provisional application No. 60/059,426, Sep. 22, 1997.

[51] Int. Cl.$^7$ ........................................................ B60P 9/00
[52] U.S. Cl. ........................... 414/462; 414/546; 224/310
[58] Field of Search ..................................... 414/462, 546, 414/680; 224/310, 315, 324

[56] References Cited

U.S. PATENT DOCUMENTS

| | | | |
|---|---|---|---|
| 3,058,607 | 10/1962 | Kiley | 414/462 |
| 3,251,519 | 5/1966 | Jones | 224/310 |
| 3,507,414 | 4/1970 | Souza | 414/462 |
| 5,104,280 | 4/1992 | Ziaylek et al. | 414/462 |
| 5,284,282 | 2/1994 | Mottino | 414/462 |
| 5,297,912 | 3/1994 | Levi | 414/462 |
| 5,398,778 | 3/1995 | Sexton | 224/210 |
| 5,605,431 | 2/1997 | Saucier et al. | 414/546 |

*Primary Examiner*—Robert P. Olszewski
*Assistant Examiner*—Isobel A. Parker
*Attorney, Agent, or Firm*—Nikolai, Mersereau & Dietz, P.A.

[57] ABSTRACT

A ladder rack adapted to be attached to a utility vehicles comprises front and rear four-bar linkages where each of the four-bar linkages comprises a base having a post projecting vertically therefrom, a ladder support member comprising a first straight bar or linkage member having a ladder support arm extending perpendicularly therefrom. A second linkage pivotally connects between the post and a first end portion of the first linkage member. Then, a dog-leg linkage having a first end pivotally attached to the first linkage member proximate its mid-point with the second end of the dog-leg linkage coupled to an elongated connecting rod that extends horizontally between the bases of the front and rear four-bar linkages. The connecting rod is journaled for rotation and when turned by a crank or motor transports ladders suspended on the ladder support arm from a position atop the vehicle to a position alongside the vehicle and vice versa.

7 Claims, 4 Drawing Sheets

TRUCK MOUNTED LADDER RACK

CROSS-REFERENCE TO RELATED APPLICATION

This application claims priority to Provisional Application Ser. No. 60/059,426 filed Sep. 22, 1997.

BACKGROUND OF THE INVENTION

1. Field of the Invention

This invention relates generally to an apparatus for facilitating the loading and unloading of heavy ladders from the roof of a motor vehicle, and more particularly to the design of a ladder rack that can be actuated to swing one or more ladders from atop a utility truck to a position along side of the truck at a lower elevation to permit them to be readily removed from the rack by a workman standing on the ground.

2. Discussion of the Prior Art

In my earlier U.S. Pat. No. 5,297,912, there is described a ladder rack that is adapted to be mounted on the roof of an automobile or van to facilitate the transport, loading and unloading of ladders. In this arrangement, first and second 4-bar linkage arrangements are joined together by a rotatable connecting rod. When the ladders are being transported on the roof of the vehicle, they lay flat on the rack with the plane of the ladders oriented generally parallel to the roof of the vehicle. By rotating the connecting rod, the ladders are raised and rotated to ultimately reside alongside to and parallel to the side of the vehicle.

While the ladder rack described in the '912 patent works well with vans, sport utility vehicles and sedan-type automobiles, a difficultly arises if the ladders are to be transported atop a truck box because a person standing on the ground cannot conveniently grasp and remove heavy ladders from the rack even when positioned along side the vehicle. This is because the top of the truck box is typically so high off the ground that the workmen cannot readily reach and remove the ladders from the rack.

Thus, a need exists for an improved ladder rack for use on truck-type utility vehicles that can be operated to shift one or more ladders from a stowed location atop a tool box or roof surface of a utility truck to a significantly lowered disposition along side of and parallel to the side of the truck at an elevation that permits a workman, standing on the ground, to reach and safely lift the ladders off from the rack.

SUMMARY OF THE INVENTION

The present invention comprises a ladder rack that is adapted to be attached to a utility vehicle. It comprises front and rear four-bar linkages, where each four-bar linkage includes a base adapted to be secured to a horizontal surface atop the utility vehicle and a post mounted on the base and projecting vertically therefrom. the four-bar linkages further include a ladder support member that comprises a first elongated rectilinear linkage member with a ladder support arm affixed to it and projecting normally therefrom proximate a first end portion thereof. A second linkage is pivotally attached to the post and to the first linkage member. A dog-leg linkage having a first end pivotally attached to the first linkage member proximate a mid-point thereof and the second end of the dog-leg linkage is connected to the elongated connecting rod that extends horizontally between bases of the front and rear four-bar linkages. Rotation of the connecting rod is effective to cause ladders suspended from the ladder support arm to be moved from atop the utility vehicle to a position alongside the vehicle for facilitating loading and unloading of the ladders.

DESCRIPTION OF THE DRAWINGS

The foregoing features, objects and advantages of the invention will become apparent to those skilled in the art form the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
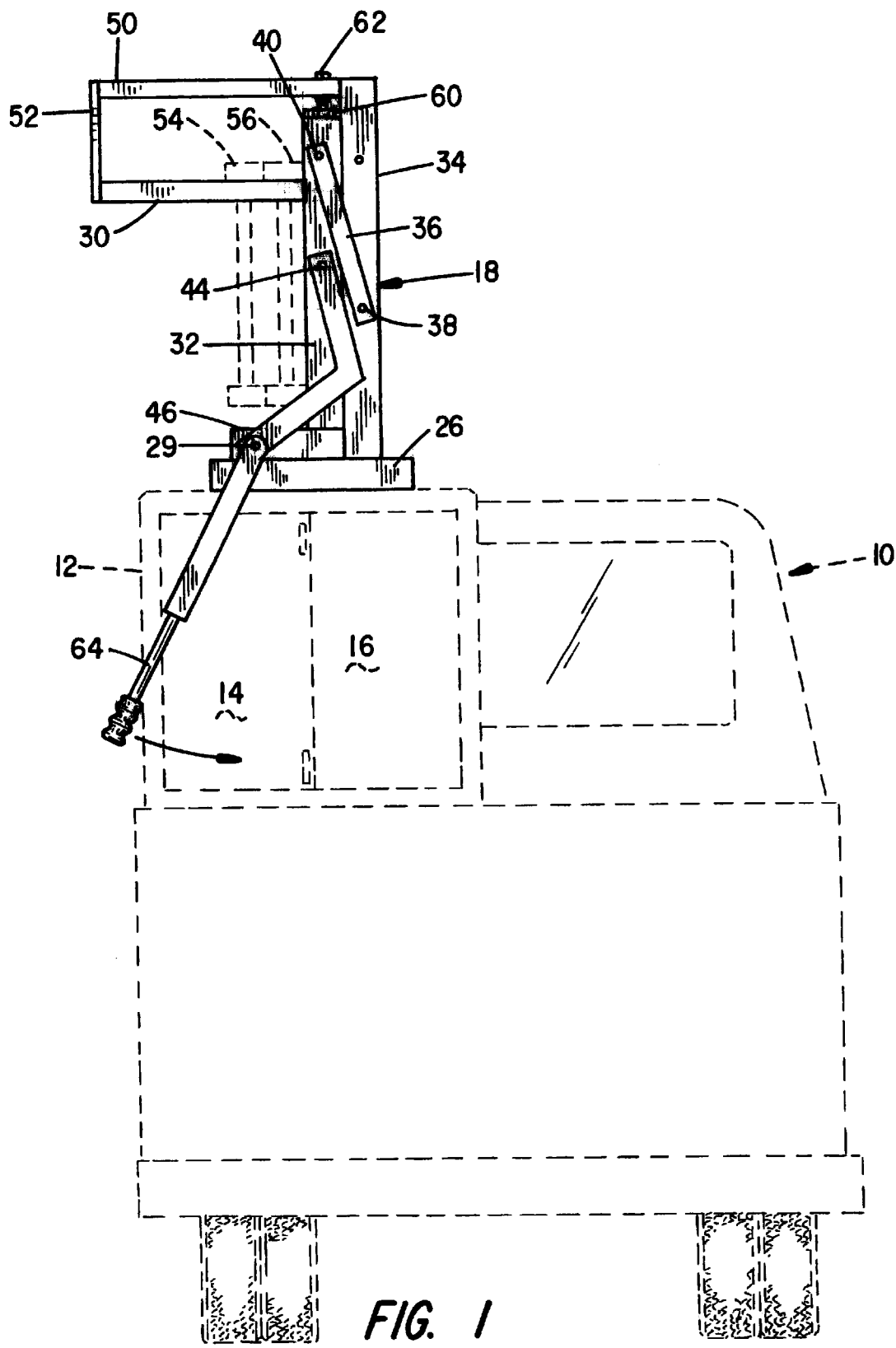
FIG. 1 is a rear view of a truck-type vehicle showing the ladder rack of the present invention mounted atop its tool box.
Figure 2:
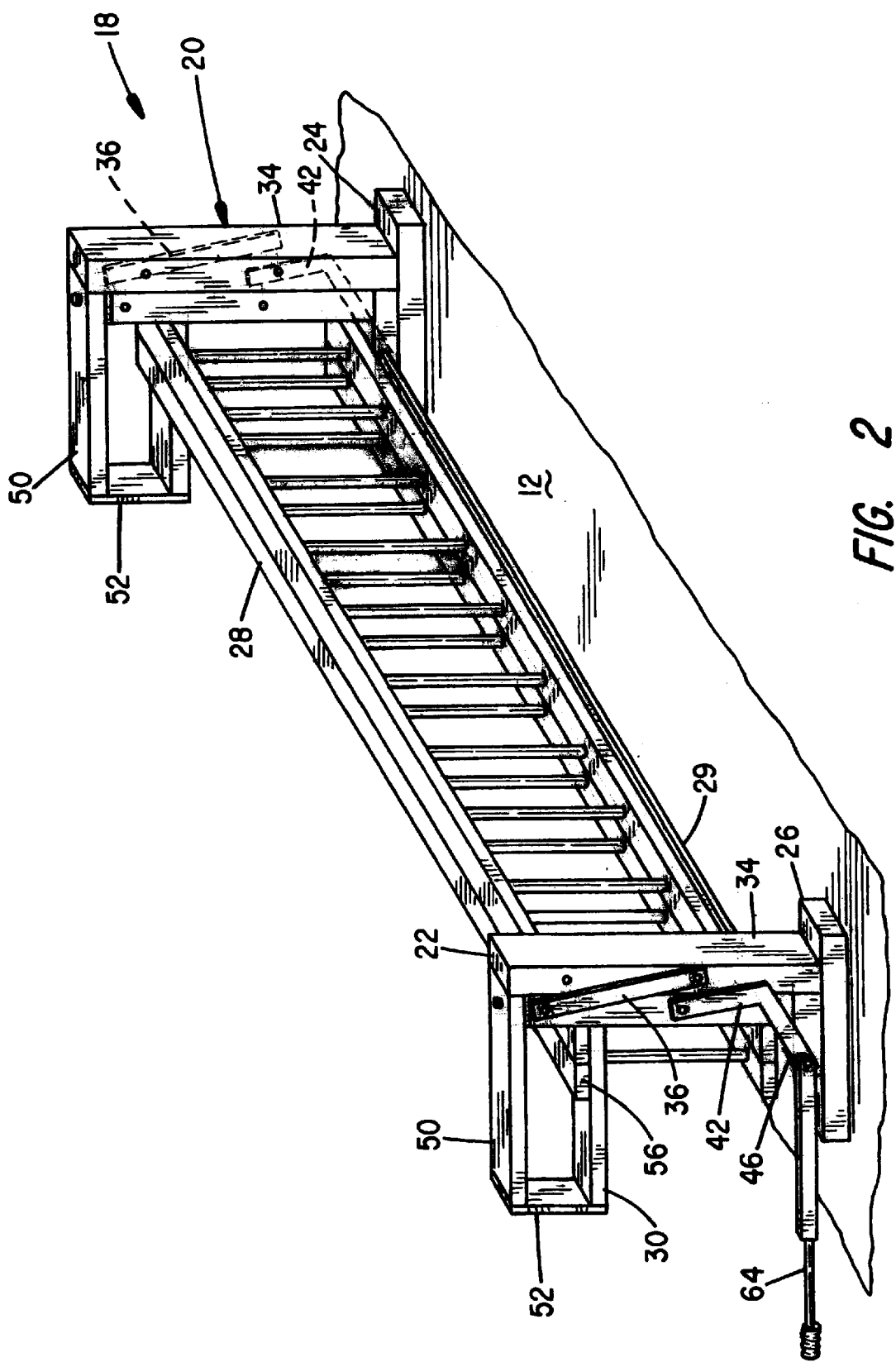
FIG. 2 is a partial perspective view of the ladder rack assembly of the present invention mounted atop a utility truck's tool box.

FIG. 1 shows a rear end view of a utility truck indicated generally by numeral 10 having a conventional tool box 12 mounted thereon. The tool box 12 has access doors 14 and 16 for reaching tools, repair parts and the like. Mounted atop the tool box 12 is a ladder rack constructed in accordance with the present invention. It is indicated generally by numeral 18 and, as is best seen in FIG. 2, includes a front 4-bar linkage 20 and an identical rear 4-bar linkage 22, that are mounted on pedestals 24 and 26, respectively, affixed to the roof of the tool box. In FIG. 2, a ladder 28 is shown as extending between and supported by the front and rear 4-bar linkage assemblies 20 and 22. A rotatably mounted connecting rod 29 extends between the front and rear 4-bar linkages.

In FIG. 1, there are shown two ladders in phantom line supported by a support arm 30, preferably fabricated from a tube of rectangular cross-section that is welded or otherwise affixed to a first linkage member 32. Welded to the pedestal 26 is a vertically upright post 34 which also may comprise a steel tube of rectangular cross-section. A second linkage 36 is pivotally joined to the upright post 34 by a pin 38. The linkage 36 is also pivotally joined to the linkage 32 by a pivot pin 40 proximate the upper end thereof. A dog-leg linkage 42 is pivotally joined to linkage 32 at one end by a pivot pin 44. The other end of the generally L-shaped dog-leg linkage 42 is fixedly joined to a connecting rod 29 that is journaled for rotation in flanges 46 affixed to the pedestals 24 and 26. The angle between the adjacent legs of the generally L-shaped dog-leg linkage is preferably about 135°.

Welded to and projecting laterally from the side of the vertical post 34 is a steel tube 50. An end plate 52 affixed to the laterally projecting support arm 30 spans the space between the rectangular tubes 30 and 50 to prevent the ladder rails 54 and 56 from slipping free of their engagement with the support arm 30.

Welded to the upper end of the linkage 32 is a plate 60 having an aperture therethrough. A pin 62 passes through the member 50 and into the aperture in the plate 60 to positively lock the 4-bar linkage in the position illustrated in FIG. 1 until such time as a crank lever 64 attached to connecting rod 29 is actuated when it is desired to lower the ladders from their stowed disposition illustrated in FIG. 1.

Figure 3:
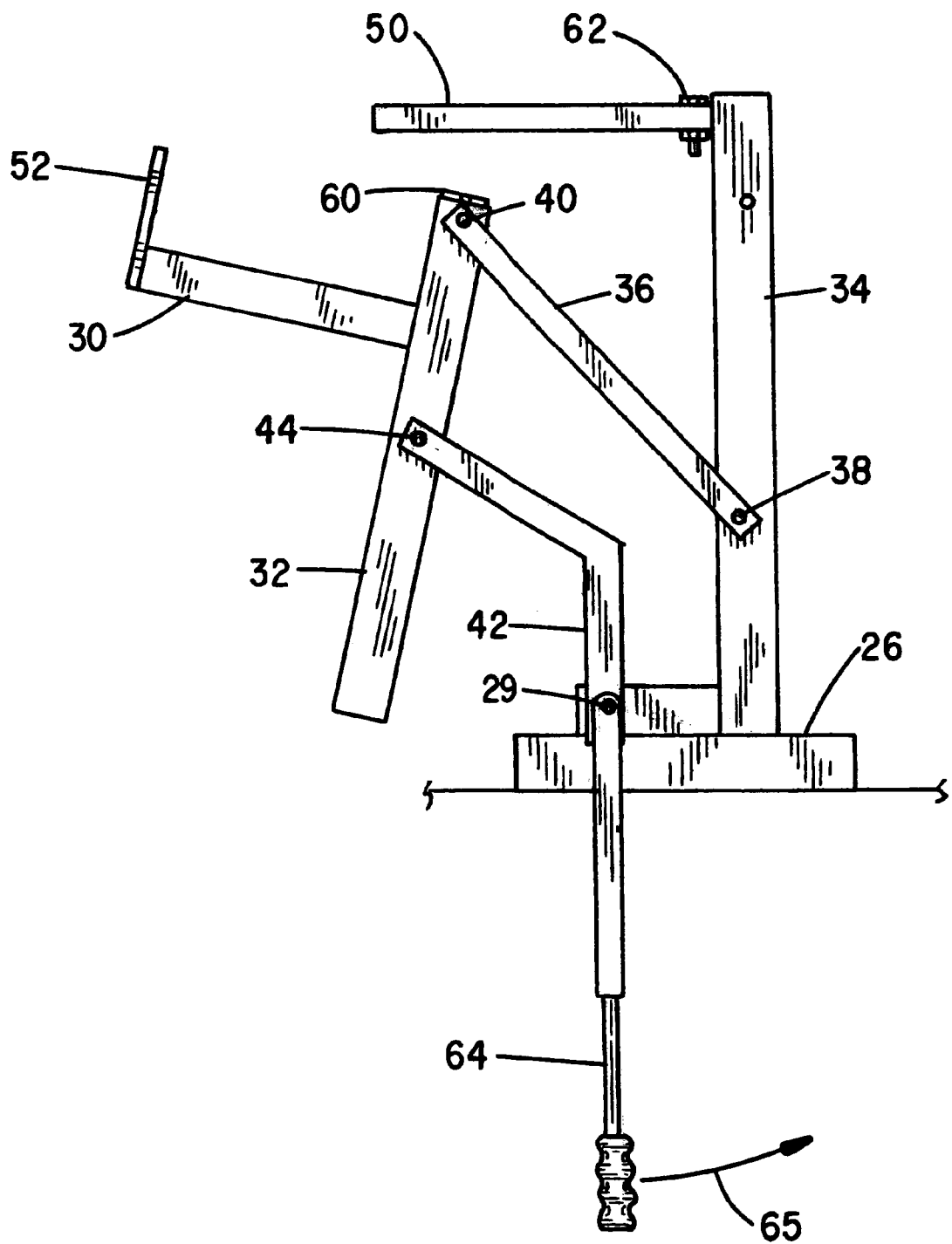
FIG. 3 illustrates a side view of one of the fourbar linkages comprising the ladder rack of the present invention when midway between its ladder stowing orientation and its lowered orientation.
Figure 4:
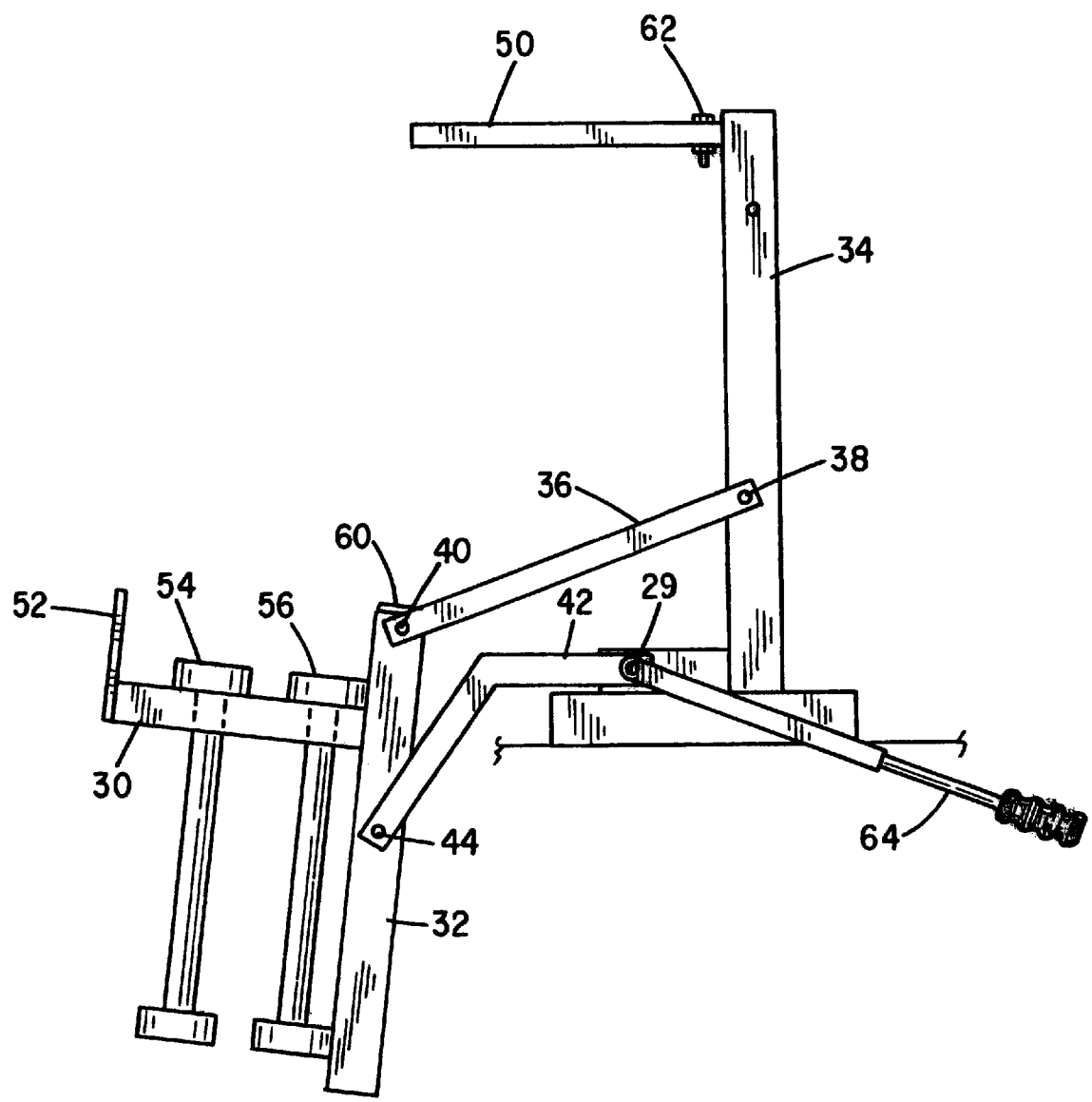
FIG. 4 is an end view of the four-bar linkage of FIG. 3 when in its fully lowered disposition.

FIG. 3 is an end view of the truck-mounted ladder rack showing the position of the 4-bar linkages 32, 34, 36, 42 midway between the stowed position shown in FIG. 1 and the deployed position shown in FIG. 4. As the crank 64 is rotated in the direction of the arrow 65 from the position shown in FIG. 1, the linkage 32 is caused to drop vertically and generally parallel to linkage 34 over a short distance allowing the apertured plate 60 on the linkage 32 to strip free of locking pin 62. Further rotation of the crank 64 then causes the linkage 32 to tip at an angle to the vertical as shown in FIG. 3 so that the lower end thereof will clear the corner of the tool box 12. Completion of the rotation of the crank 64 to the position shown in FIG. 4 positions the ladders 54 and 56 down below the level of the tool box 12 and parallel to the side of the truck to the point where a workman standing on the ground may readily grasp the ladders at shoulder height and remove them from the arm 30 that is welded to the linkage 32.

The operation of stowing the ladders atop the box 12 is just the opposite maneuver. The ladders are first loaded onto the support arms 30 of the front and rear 4-bar linkage assemblies and then the operator pulls the crank arm 34 in a clockwise direction as viewed in FIG. 4, causing the ladders to first be moved vertically a short distance and then tipped to an angle as shown in FIG. 3 so that the lower rail of the ladders will clear the corner of the tool box 12. Then, the linkage 32 swings inward toward linkage 34 until linkage 32 is in an over-center position adjacent to and parallel with linkage 34. Continued clockwise movement of the crank 64 results in the pin 62 passing through the aperture in the plate 60 affixed to the upper end of the linkage 32, positively locking the ladder rack. When so locked, shock and vibration of the ladders on the arm 30 as the truck passes over bumps in the road cannot release the front and rear 4-bar linkage assemblies.

In FIG. 2, the connecting rod 29 connects to the L-shaped dog-leg linkages 42 on the front and rear 4-bar linkage assemblies so that rotation of the crank 64 simultaneously actuates the front and rear 4-bar linkage assemblies. Instead of a manual crank, a DC motor and gear box may be operatively coupled to the connecting rod for rotating same.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A ladder rack adapted to be attached to a utility vehicle comprising:
   (a) front and rear four-bar linkages, each comprising:
      (i) a base adapted to be fixedly secured to a horizontal surface atop the utility vehicle and a post secured to the base and projecting vertically therefrom;
      (ii) a ladder support member comprising a first elongated rectilinear linkage member with a ladder support arm affixed thereto projecting normally therefrom proximate a first end portion thereof,
      (iii) a second linkage having first and second ends, the first end being pivotally attached directly to the post and a second end pivotally attached to the first linkage member in the first end portion thereof, and
      (iv) a dog-leg linkage having a first end pivotally attached to the first linkage member proximate a mid-point thereof; and
   (b) an elongated connecting rod extending horizontally between bases of the front and rear four-bar linkages and journaled for rotation on the bases with a second end of the dog-leg linkages of the front and rear four-bar linkage assemblies affixed to the elongated connecting rod for rotation therewith, rotation of the dog-leg linkages causing the first linkage member to tilt at an angle to the post allowing a second end of the first linkage member to clear a side edge of the vehicle before descending vertically, the ladder support member being moved from a stowed position parallel and closely adjacent to the post to a deployed position laterally displaced from the post and below the horizontal surface.

2. The ladder rack of claim 1 and further including a means for rotating the elongated connecting rod through a predetermined arc.

3. The ladder rack of claim 2 wherein the rotating means is a crank.

4. The ladder rack of claim 1 and further including an end plate affixed to an end of the support arm.

5. The ladder rack of claim 4 and further including a rigid bar fixedly attached to an upper end of the post and cooperating with the end plate when the ladder support member is in the first location.

6. The ladder rack of claim 5 and further including locking device extending between the rigid bar and the first linkage member when the ladder support member is in the first location.

7. The ladder rack of claim 1 wherein the dog-leg linkage comprises first and second straight leg portions joined at an angle of about 135°.

* * * * *